(12) United States Patent
Alpert et al.

(10) Patent No.: US 7,707,530 B2
(45) Date of Patent: Apr. 27, 2010

(54) INCREMENTAL TIMING-DRIVEN, PHYSICAL-SYNTHESIS USING DISCRETE OPTIMIZATION

(75) Inventors: Charles J. Alpert, Cedar Park, TX (US); Zhuo Li, Cedar Park, TX (US); Michael D. Moffitt, Austin, TX (US); David A. Papa, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 11/941,105

(22) Filed: Nov. 16, 2007

(65) Prior Publication Data

US 2009/0132981 A1   May 21, 2009

(51) Int. Cl.
*G06F 17/50* (2006.01)
*G06F 9/45* (2006.01)

(52) U.S. Cl. .................... 716/6; 716/5; 716/18; 703/13; 703/14

(58) Field of Classification Search ................. 716/1–2, 716/5–6, 18; 703/13–14
See application file for complete search history.

(56) References Cited

U.S. PATENT DOCUMENTS

| 6,996,512 B2 * | 2/2006 | Alpert et al. ................... 703/14 |
| 7,290,239 B1 * | 10/2007 | Singh et al. ................... 716/18 |
| 7,624,364 B2 * | 11/2009 | Albrecht et al. ............... 716/6 |

OTHER PUBLICATIONS

Luo et al., A New LP Based Incremental Timing Driven Placement for High Performance Design, Jul. 24-28, 2006, ACM, pp. 1115-1120.*
Alpert et al.; "Method for Incremental, Timing-Driven, Physical-Synthesis Optimization"; U.S. Appl. No. 11/866,231, filed Oct. 2, 2007.
Alpert et al.; "Fast and Flexible Buffer Tress That Navigate the Physical Layout Environment"; in Proceedings of the 41th Design Automation Conference (DAC 2004); pp. 24-29; 2004.
Burstein et al.; "Timing Influenced Layout Design"; in Proceedings of the 22nd Design Automation Conference (DAC 1985); pp. 124-130; 1985.
Chen et al.; "Simultaneous Timing-Driven Placement and Duplication"; in Proceedings of the 13th International Symposium on Field Programmable Gate Arrays (FPGA 2005); pp. 51-59; 2005.
Choi et al.; "Incremental Placement for Timing Optimization"; in Proceedings of the 2003 International Conference on Computer-Aided Design (ICCAD 2003); pp. 463-466; 2003.

(Continued)

*Primary Examiner*—Thuan Do
*Assistant Examiner*—Nghia M Doan
(74) *Attorney, Agent, or Firm*—Dillon & Yudell LLP

(57) ABSTRACT

A method, data processing system and computer program product for optimizing the placement of logic gates of a subcircuit in a physical synthesis flow. A Path Smoothing utility identifies one or more movable gates based on at least one selection criteria. A set of legalized candidate locations corresponding to one or more identified movable gates is generated. A disjunctive timing graph based on the generated set of legalized candidate locations is then generated. An optimal location of one or more movable gate(s) is determined using a recursive branch-and-bound search and stored in the computing device.

15 Claims, 5 Drawing Sheets

OTHER PUBLICATIONS

Chowdhary et al.; "How Accurately Can We Model Timing in a Placement Engine?"; in Proceedings of the 42nd Design Automation Conference (DAC 2005); pp. 801-806; 2005.

Chowdhary et al.; "Repeater Insertion for Concurrent Setup and Hold Time Violations With Power-Delay Trade-Off"; in Proceedings of the 2007 International Symposium on Physical Design (ISPD2007); pp. 59-66; 2007.

Cong et al.; Buffer Clock Planning for Interconnect-Driven Floor Planning in Proceedings of the 1999 International Conference on Computer-Aided Design (ICCAD 1999), pp. 358-363; 1999.

Halpin et al.; "Timing Driven Placement Using Physical Net Constraints"; in Proceedings of the 38th Design Automation Conference (DAC 2001); pp. 780-783; 2001.

Hamada et al.; "Prime: A Timing-Driven Placement Tool Using a Piecewise Linear Resistive Network Approach"; in Proceedings of the 30th Design Automation Conference (DAC1993); pp. 531-536; 1993.

Jackson et al.; "Performance-Driven Placement of Cell-Based IC's"; in Proceedings of the 26th Design Automation Conference (DAC 1989); pp. 370-375; 1989.

Kahng et al.; "Min-Max Placement for Large-Scale Timing Optimizaton"; Proceedings of the 2002 International Symposium on Physical Design (ISPD 2002); pp. 143-148; 2002.

Luo et al.; "A New LP Based Incremental Timing Driven Placement for High Performance Designs"; in Proceedings of the 43$^{rd}$ Design Automation Conference (DAC 2006); pp. 1115-1120; 2006.

Nair et al.; "Generation of Performance Constraints for Layout"; IEEE Trans. on CAD of Integrated Circuits and Systems, 8(8):860-874; 1989.

Oliveira et al.; "An Exact Gate Assignment Algorithm for Tree Circuits Under Rise and Fall Delays"; in Proceedings of the 2000 International Conference on Computer-Aided Design (ICCAD-2000); pp. 451-457; 2000.

Ren et al.; "Hippocrates: First-Do-No-Harm Detailed Placement"; in Proceedings of the 12th Asia and South Pacific Design Automation Conference (ASP-DAC 2007); 2007.

Swartz et al.; "Timing Driven Placement for Large Standard Cell Circuits"; in Proceedings of the 32st Design Automation Conference (DAC-1995); pp. 211-215; 1995.

Trevillyan et al.; "An Integrated Environment for Technology Closure of Deep Submicron IC Designs"; IEEE Design & Test of Computers, 21(1):14-22, 2004

Wang et al.; "An LP Based Methodology for Improved Timing-Driven Placement"; in Proceedings of the 2005 Asia and South Pacific Design Automation Conference (ASP-DAC 2005); pp. 1139-1143; 2005.

* cited by examiner

INCREMENTAL TIMING-DRIVEN, PHYSICAL-SYNTHESIS USING DISCRETE OPTIMIZATION

BACKGROUND OF THE INVENTION

1. Technical Field

The present invention generally relates to integrated circuit design tools and in particular to integrated circuit design tools that optimize area, performance, and signal integrity in integrated circuits.

2. Description of the Related Art

Existing methods have sought to improve the placement of negative-slack gates of a circuit in a physical synthesis flow. While several solutions to this problem exist, there are several drawbacks to these existing solutions. One major drawback of existing solutions is that these existing solutions consider only the placement of a single, movable gate within an integrated circuit design. In addition, existing physical synthesis optimization methods consider gates (i.e., clocked repeaters and unclocked repeaters, such as buffers and inverters) that are adjacent to a single, movable gate as unmovable. This designation of certain gates as unmovable can possibly over constrain gate placement optimization efforts.

One existing solution, known as the Rip Up and Move Boxes with Linear Evaluation (RUMBLE) utility, employs linear programming (LP) to consider the optimal placement of multiple gates under a linear delay model. Such use of LP assumes that subsequent buffer reinsertions (i.e., re-buffering) will be performed after the optimal gate locations have been ascertained. However, in later stages of refinement when re-buffering is not permitted, the linear delay model does not hold. Moreover, the presence of obstacles and keep-out regions on the chip circuit often limits the possible legal locations for a particular gate. When there are obstacles to gate placement, feasible candidate positions may need to be discretized, a task that cannot be performed by the LP formulation within RUMBLE.

Lastly, existing gate optimization techniques are based upon an exhaustive enumeration approach for finding an optimal solution to the problem of incremental timing-driven physical synthesis. Under exhaustive enumeration, every possible assignment of candidate locations for gate placement is attempted and solved. Thus, an exhaustive enumeration approach would fare poorly in large problem instances, as the number of possible gate assignments grows exponentially with the number of movable gates (i.e., with M movable gates and C candidates per gate, a total of $M^C$ gate assignments would be generated).

SUMMARY OF AN EMBODIMENT

Disclosed are a method, system, and computer program product for optimizing a timing-driven placement of one or more movable gates of a circuit in a physical synthesis flow using a non-linear delay model. A path smoothing utility is provided, which executes on a processing device/computer to: (a) identify one or more movable gates based on at least one selection criteria; (b) generate a set of legalized candidate locations corresponding to one or more identified movable gates; (c) generate a disjunctive timing graph based on the generated set of legalized candidate locations; (d) determine an optimal location of one or more movable gate(s) using a recursive branch-and-bound search; and (e) store the optimal location in the processing device/computer. According to one embodiment, in addition to gate placement, the disjunctive timing graph permits additional discrete transforms that are associated with a plurality of optimization variables. Such optimization variables include, but are not limited to gate repowering, gate voltage threshold ($V_t$) assignment, and wire sizing.

The above, as well as additional features of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF AN ILLUSTRATIVE EMBODIMENT

The illustrative embodiments provide a method, system, and computer program product for optimizing the placement of logic gates of a subcircuit in a physical synthesis flow, in accordance with one embodiment of the invention. Physical synthesis is the process of creating a specification for a physical integrated circuit (IC) given a logic circuit specification. As utilized herein, a logic gate is a computer circuit device with several inputs signals but only one output signal that can be activated by particular combinations of input signals. Moreover, combinations of logic gates are used to store information in sequential logic systems, forming a latch. In order to improve the overall circuit timing of a subcircuit, new locations for one or more movable logic gates are selected on a timing-driven basis by directly minimizing the signal delay of a source-to-sink timing arc. Timing arcs measure the signal delay between the inputs and outputs of sequential and/or combination In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
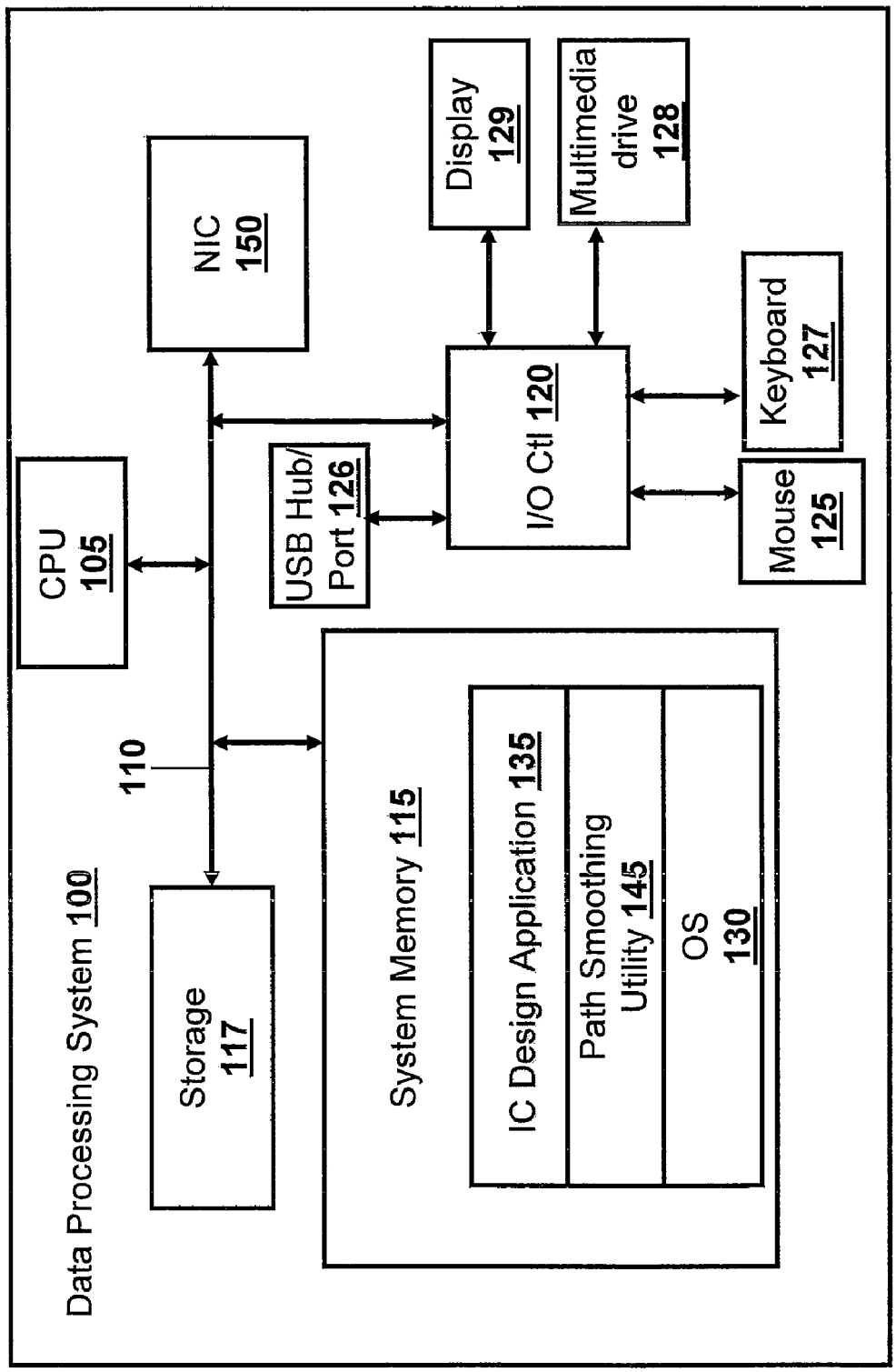
FIG. 1 is a high level block diagram representation of a data processing system, according to one embodiment of the invention.

With reference now to FIG. 1, depicted is a block diagram representation of a data processing system (DPS) 100. DPS 100 comprises at least one processor or central processing unit (CPU) 105 connected to system memory 115 via system interconnect/bus 110. Also connected to system bus 110 is I/O controller 120, which provides connectivity and control for input devices, of which pointing device (or mouse) 125 and keyboard 127 are illustrated, and output devices, of which display 129 is illustrated. Additionally, a multimedia drive 128 (e.g., CDRW or DVDRW drive) and Universal Serial Bus (USB) hub/port 126 are illustrated, coupled to I/O controller 120. Multimedia drive 128 and USB hub/port 126 may operate as both input and output mechanisms for inserting removable storage devices therein. DPS 100 also comprises storage 117, within which data/instructions/code may be stored. DPS 100 is also illustrated with a network interface card (NIC) 150 coupled to system bus 110. NIC 150 enables DPS 100 to connect to one or more access networks, such as the Internet.

Notably, in addition to the above described hardware components of DPS 100, various features of the invention are completed via software (or firmware) code or logic stored within system memory 115 or other storage (e.g., storage 117) and executed by CPU 105. In one embodiment, data/instructions/code from storage 117 populates the system memory 115, which is also coupled to system bus 110. System memory 115 is defined as a lowest level of volatile memory (not shown), including, but not limited to, cache memory, registers, and buffers. Thus, illustrated within system memory 115 are a number of software/firmware components, including operating system (OS) 130 (e.g., Microsoft Windows®, a trademark of Microsoft Corp; or GNU®/Linux®, registered trademarks of the Free Software Foundation and Linus Torvalds; or Advanced Interactive eXecutive —AIX®—, registered trademark of International Business Machines—IBM), Integrated Circuit (IC) Design application 135, and Path Smoothing utility 145. In actual implementation, components or code of OS 130 may be combined with those of IC Design application 135 and Path Smoothing utility 145, collectively providing the various functional features of the invention when the corresponding code is executed by the CPU 105. For simplicity, IC Design application 135 and Path Smoothing utility 145 are illustrated and described as a stand alone or separate software/firmware component, which is stored in system memory 115 to provide/support the specific novel functions described herein.

CPU 105 executes IC Design application 135, Path Smoothing utility 145 as well as OS 130, which supports the user interface features of IC Design application 135 and Path Smoothing utility 145. In the illustrative embodiment, Path Smoothing utility 145 optimizes a timing state of an original subcircuit by determining a new optimized placement(s) of movable gate(s). Path Smoothing utility 145 assists IC Design application 135, which simulates an IC design. In this regard, DPS 100 is being used as an IC design platform for Path Smoothing utility 145 and IC Design application 135. The IC design application 135 is modified/enhanced with the functionality of Path Smoothing utility 145. Among the software code/instructions provided by Path Smoothing utility 145, and which are specific to the invention, are: (a) code for identifying one or more movable gates based on at least one selection criteria; (b) code for generating a set of legalized candidate locations corresponding to one or more identified movable gates; (c) code for generating a disjunctive timing graph based on the generated set of legalized candidate locations; (d) code for determining an optimal location of one or more movable gate(s) using a recursive branch-and-bound search; and (e) code for storing the optimal location in a computing device.

For simplicity of the description, the collective body of code that enables these various features is referred to herein as Path Smoothing utility 145. According to the illustrative embodiment, when CPU 105 executes Path Smoothing utility 145 and IC Design application 135 within the context of an existing/generated IC design, DPS 100 initiates a series of functional processes that enable the above functional features as well as additional features/functionality, which are described below within the description of FIGS. 2-5.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM System p5™ (a trademark of International Business Machines—IBM), a product of International Business Machines Corporation in Armonk, N.Y., running the AIX® operating system or LINUX® operating system.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

Figure 2:
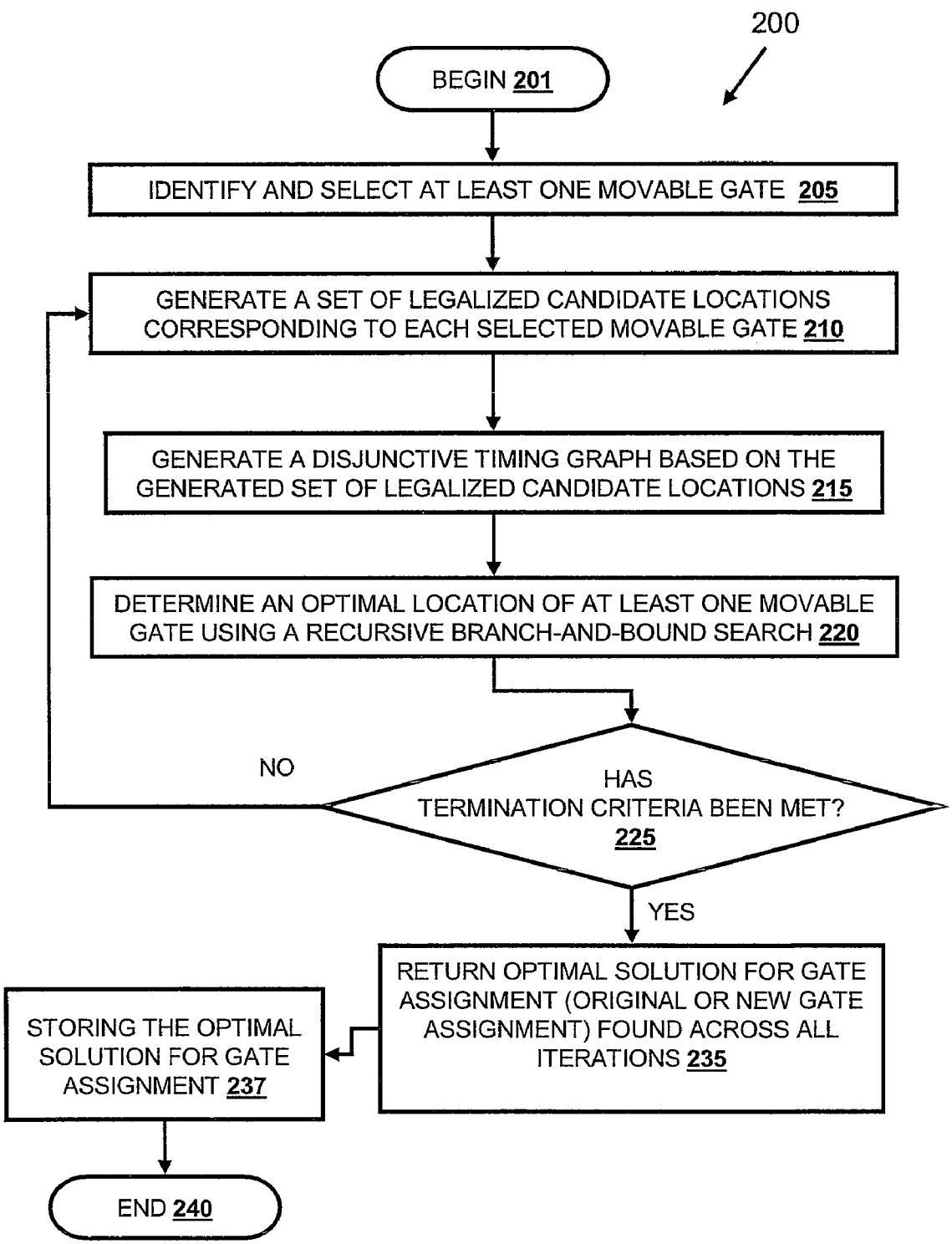
FIG. 2 represents a high level logical flowchart illustrating a method of incremental, timing-driven gate placement optimization, in accordance with one embodiment of the invention.

FIG. 2 represents a flow chart illustrating the exemplary method 200 of optimizing the placement of logic gates of a subcircuit in a physical synthesis flow, according to an illustrative embodiment of the invention. Although the following methods illustrated in FIG. 2 may be described with reference to components shown in FIG. 1 and later shown in FIGS. 3-5, it should be understood that this exemplary method is merely for convenience and alternative components and/or configurations thereof can be employed when implementing the method. Key portions of the method may be completed by Path Smoothing utility 145 (FIG. 1). Path Smoothing utility 145 (FIG. 1) executes within DPS 100 (FIG. 1). Moreover, Path Smoothing utility 145 controls specific operations of/on DPS 100. The method is described from the perspective of Path Smoothing utility 145 within the IC design platform of DPS 100.

The process of FIG. 2 begins at initiator block 201 and proceeds to block 205, at which the Path Smoothing utility 145 (FIG. 1) identifies one or more movable gate(s) within the circuit design for timing-driven placement optimization. In this regard, there are several selection criteria that can be used to identify these movable gate(s). Selection criteria include, but are not limited to, (i) the most critical gate(s) in a circuit, (ii) the most critical paths of a circuit, and (iii) the gate(s) having the largest slack differential between input timing point and output timing point.

As used herein, the following terms are defined:

"timing point" is a vertex in a timing graph; conventionally, all gate pins (input or output) in a circuit have an associated timing point; a timing arc is formed between two timing points;

"slack" at a timing point is defined as the difference between the required arrival time (RAT) at the timing point and the actual arrival time (AAT) at the timing point. A negative slack value indicates that the signal that is sent to the input of the timing point is actually arriving after its required arrival time. A positive slack value indicates that the signal is arriving before its required arrival time;

"critical gate" is a gate that is characterized as having a negative slack value;

"critical path" is a sequence of connected gates, whereby the combination of each connected gate is characterized as having an overall negative slack value; and "slack differential" is defined as the difference between the smallest slack value of an output timing point and the largest slack value of an input timing point; or vice versa. A large slack differential, especially when either the input timing point or the output timing point has a negative slack value, indicates that the latch timing can likely be improved by moving the movable gate/latch.

Once a movable gate(s) is/are identified for placement optimization, Path Smoothing utility 145 generates a set of legalized candidate locations corresponding to one or more of the identified movable gates, as depicted in block 210. In this regard, there are a number of different candidate location search strategies that can be implemented. Such strategies include, but are not limited to: (i) a cardinal direction approach, (ii) a legalized cardinal direction approach, and (iii) a nearest legal neighbor approach.

According to a cardinal direction approach, for a movable gate whose current placement/location coordinate on the chip is (x, y), Path Smoothing utility 145 would consider the following four candidate locations: (x+Δx, y), (x−Δx, y), (x, y+Δy), (x, y−Δy) for a given (Δx, Δy), in addition to the current placement/location coordinate of the movable gate. Under the above approach, the possibility exists that a candidate location is placed in a non-legalized location (i.e. an unrealizable location), such as a chip region containing a fixed macro or other obstacle. Another candidate location search strategy approach, the legalized cardinal direction approach, considers the closest legal (i.e., feasible) locations to each of the candidate locations identified in the cardinal direction approach (i.e., respecting blockages and large fixed macros). Further still, the nearest legal neighbor approach considers the n nearest legal locations that are closest to the movable gate's current coordinate, for a specified number n.

Figure 3:
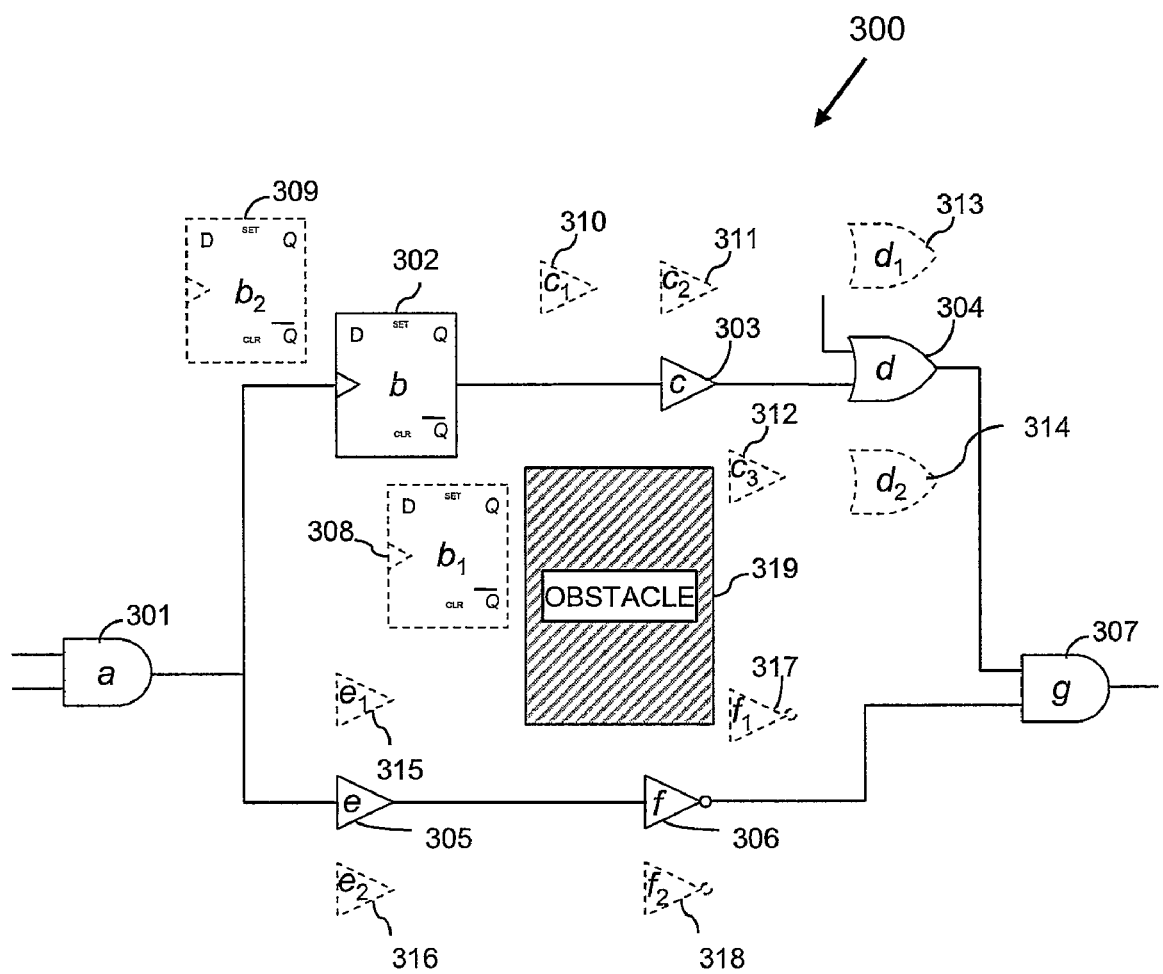
FIG. 3 illustrates an in-memory representation of a subcircuit, corresponding to a first stage and a second stage in the execution of a path smoothing utility, according to an illustrative embodiment of the invention.

Referring now to FIG. 3, the exemplary method steps depicted in blocks 205 and 210 (of FIG. 2) are further illustrated by exemplary subcircuit 300. Subcircuit 300 represents a portion of a larger chip circuit (not shown). Subcircuit 300 includes a set of M movable gates 302-306, a fixed source gate 301, and a fixed sink gate 307. A movable gate, as used herein, may represent sequential gates (i.e., latches, flip-flops, and the like) or combinational gates (i.e., AND/OR gates, buffers, inverters, and the like). Note that in order to isolate the subcircuit 300 from the larger chip circuit, Path Smoothing utility 145 must identify the boundaries of subcircuit 300. This is achieved by a basic N-hop neighborhood approach, where any gate within N steps of a movable gate is included in the set of movable cells. The N-hop neighborhood approach requires both a forward sweep (to collect sinks) and a backward sweep (to collect sources), which are performed in tandem. In selecting subcircuit 300, Path Smoothing utility 145 may remove intermediate buffers on a subset of nets, under the assumption that those nets will later be re-buffered. Since the presence or absence of these buffers does not change the logical function of the circuit, the correctness of the circuit is maintained.

As stated in combination with blocks 205 and 210 (of FIG. 2), once the set of M movable gate(s) 302-306 have been identified, a set of legalized candidate locations corresponding to one or more identified movable gate(s) 302-306 is generated. Legalized candidate locations 308-318 are illustrated in FIG. 3. For example: (a) legalized candidate locations 308, 309 correspond to movable gate 302; (b) legalized candidate locations 310, 311, 312 correspond to movable gate 303; (c) legalized candidate locations 313, 314 correspond to movable gate 304; (d) legalized candidate locations 315, 316 correspond to movable gate 305, and (e) legalized candidate locations 317, 318 correspond to movable gate 306. In the embodiment shown in FIG. 3, the candidate location search strategy implemented is the nearest legal neighbor approach, which is described above. Notably, under the nearest legal neighbor approach, candidate locations 308-318 are generated such that obstacle/fixed macro 319 on subcircuit 300 is avoided. Thus, the pre-legalization of a candidate location ensures the feasibility of placing a movable gate in the movable gate's respective candidate location(s).

Figure 4:
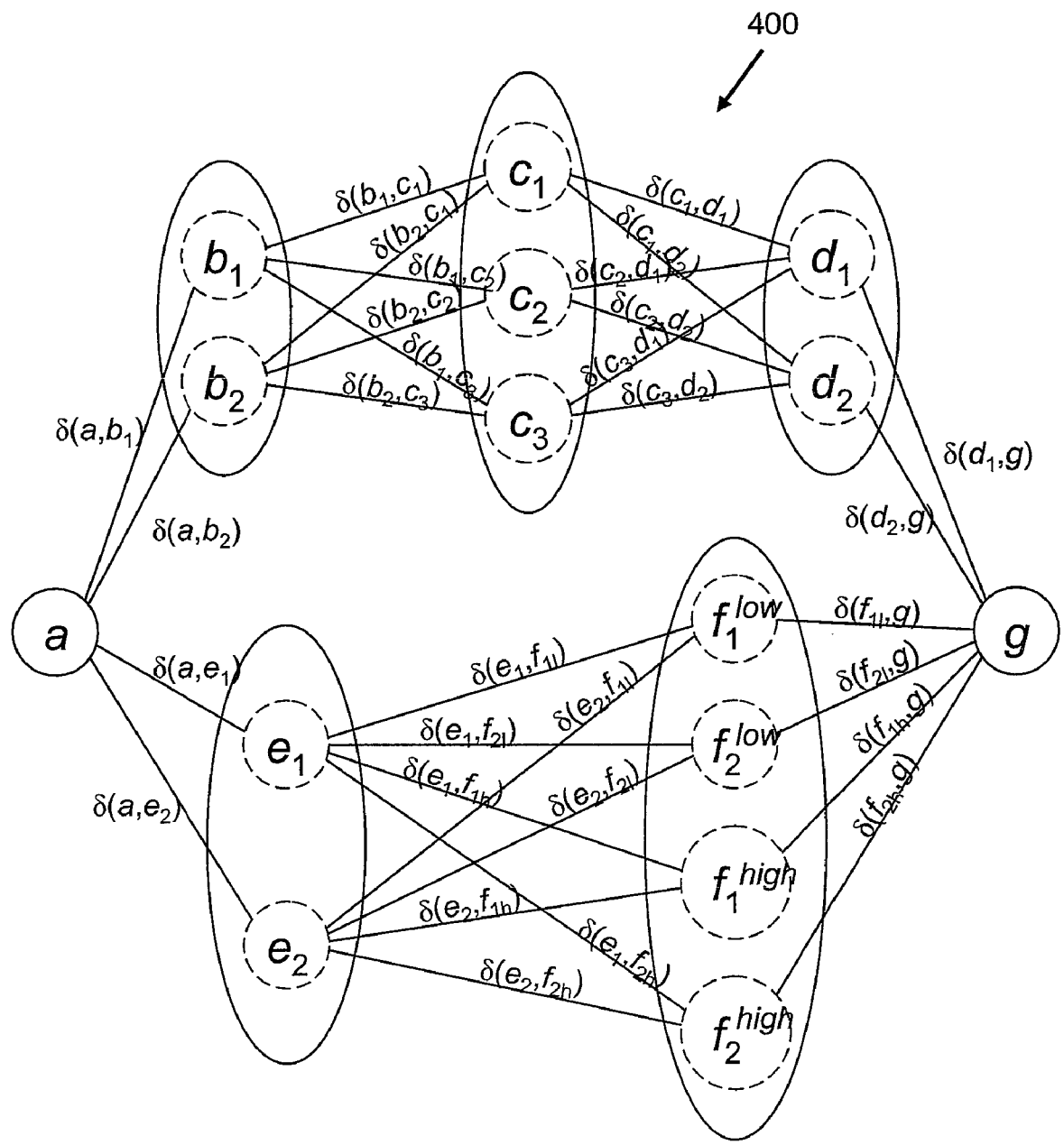
FIG. 4 represents a disjunctive timing graph of the subcircuit shown in FIG. 3, corresponding to a third stage in the execution of the path smoothing utility, according to an illustrative embodiment of the invention.

Referring back to the flowchart illustrating method 200 (FIG. 2), once the legalized candidate locations 308-318 (FIG. 3) have been generated, method 200 continues to block 215. According to block 215, a disjunctive timing graph based on the generated set of legalized candidate locations 308-318 is generated. With reference now to FIG. 4, disjunctive timing graph 400 is illustrated. Timing graph 400 includes a vertex (i.e., point) for each fixed gate 301, 307, as well as a vertex for each legalized candidate location 308-318 of movable gate(s) 302-306 in subcircuit 300. As a result, a timing arc for each pair $(l_i, l_j)$ of adjacent vertices (e.g., timing arcs a-$b_1$, $b_1$-$c_3$, $f_1^{high}$-g, etc.) is constructed, specifying an estimate of the delay $\delta(l_i, l_j)$ that would occur between the pair $(l_i, l_j)$ of adjacent vertices. For simplicity, disjunctive timing graph 400 has been restricted to show legalized candidate locations to new positions. However, in practical implementation, disjunctive timing graph would also include and consider the original locations of movable gates 302-306.

It should be understood by persons of ordinary skill in the art that the correlation between the values of the various timing arcs is not assumed, and that any delay model can be used. For instance, half-perimeter wirelength (HPWL) can be used to create a linear-delay model if re-buffering will be performed as a post-processing step. In such case where rebuffering is performed, delay $\delta(l_i, l_j)$ is a pure function of geometric location and calculated/evaluated as:

$$\text{delay } \delta(l_i, l_j) = \tau*(\text{abs}(l_i.x - l_j.x) + \text{abs}(l_i.y - l_j.y));$$

where τ is a technology dependent parameter equal to the ratio of the delay of an optimally-buffered, arbitrarily-long wire segment to its length:

$$\tau = \frac{\text{delay (wire)}}{\text{length (wire)}}$$

Alternatively, if rebuffering will not occur, more elaborate and accurate timing models can be used. For instance, the Elmore delay model captures a quadratic function of wirelength on 2-pin nets:

$$\text{delay} \quad \delta(l_i, l_j) = 0.5 * r_o * c_o * (\text{abs}(l_i.x - l_j.x) + \text{abs}(l_i.y - l_j.y))^2;$$

whereby $c_o$ represents the initial capacitance that is shared by all wires and gates.

Moreover, the delay between gates on higher degree nets can be estimated by a bounding-box model, or by querying a timing calculation tool (e.g., EinsTimer™, which is a trademark of International Business Machines, Inc.) that generates Steiner trees.

Once the delay values for each timing arc has been determined, the gate placement optimization problem is viewed as disjunctive timing graph 400, whereby the term disjunctive refers to the fact that all combinations of delays are included. A traditional timing graph can be obtained from disjunctive timing graph 400 by selecting a single candidate location for each respective movable gate (e.g., movable gates "b"-"f", 302-306), and extracting the appropriate timing arcs. Moreover, it is important to note that the adjusted timing arcs of disjunctive timing graph 400 results from the combination of two optimization variables: gate placement and gate repowering (e.g., gate "f", 306 has candidate locations "$f_1^{low}$", "$f_1^{high}$", "$f_2^{low}$", "$f_2^{high}$" for high/low powered gates). However, disjunctive timing graph 400 permits discrete transforms associated with a plurality of optimization variables besides gate placement and gate repowering. Other optimization variables include, but are not limited to gate voltage threshold ($V_t$) assignment, wire sizing, and/or any other discrete transformation that has an effect on signal propagation timing (i.e., slack and net delay).

Referring again to the flowchart shown in FIG. 2, once disjunctive timing graph 400 (FIG. 4) is generated, method 200 continues to block 220, whereby a recursive branch-and-bound search is employed to determine an optimal location of movable gate(s) 302-306 (FIG. 3). As used herein, the term optimal location refers to one or more coordinates of a candidate location that is associated with the maximum slack value that can be obtained from all possible gate assignments. Under the recursive branch-and-bound search, instead of exploring all possible gate assignments, some sets of gate assignments are pruned (i.e., discarded) from further search based on cost estimates calculated during the branch-and-bound search.

Figure 5:
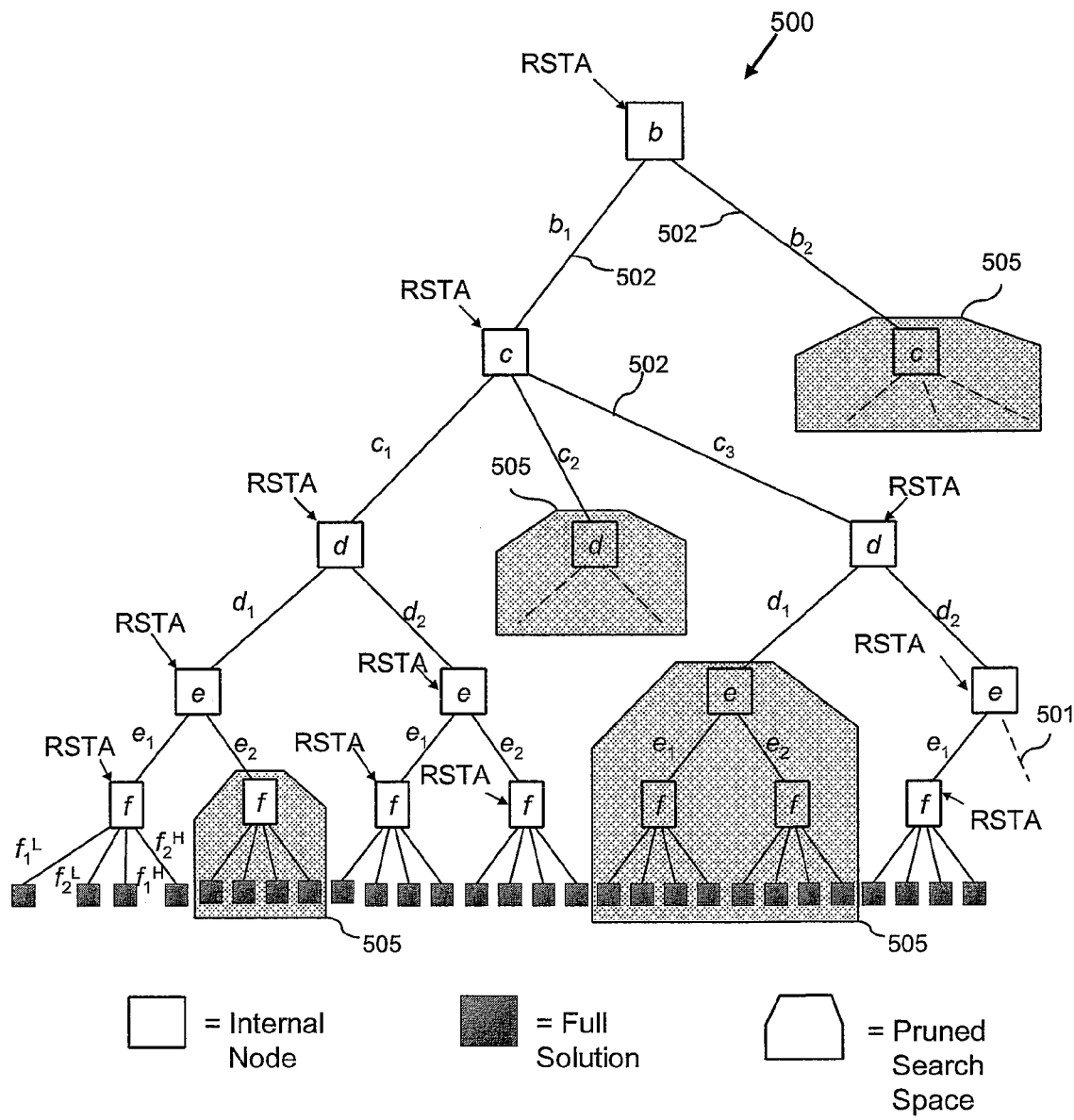
FIG. 5 illustrates a recursive branch-and-bound search of the subcircuit shown in FIG. 3 corresponding to a fourth stage in the execution of the path smoothing utility, according to an illustrative embodiment of the invention.

Turning now to FIG. 5, a branch-and-bound search tree 500 is shown. Search tree 500 includes internal nodes "b"-"f". Each internal node b-f of FIG. 5 corresponds respectively to movable gate "b"-"f" of FIG. 3. According to exemplary embodiment shown in FIG. 5, each internal node branches off depending on the number of legalized candidate locations (e.g., 308-318) that have been generated for a particular movable gate. As a result of such branching, an internal node may be represented by a plurality of nodes corresponding to the same movable gate (e.g., internal node "e" is comprised of four nodes, internal node "d" is comprised of three nodes, etc.). For example, internal node "b" branches off into two branches, "$b_1$" and "$b_2$", which connect to the next internal node "c". Branches "$b_1$" and "$b_2$" of FIG. 5 correspond to two different legalized candidate locations 308, 309 for movable gate 302 (FIG. 3). Dashed lines 501 represent additional branches (not shown) branching from an internal node. Moreover, branches labeled $f_1^L$, $f_2^L$, $f_1^H$, $f_2^H$, represent branches having a particular combination of high (H) or low (L) powered gates at a specific placement. For simplicity, only the leftmost set of branches below internal node "f" has been labeled.

At every internal node "b"-"f" in the branch-and-bound search tree 500, a relaxed variation of Static Timing Analysis (RSTA) is performed. RSTA shall now be explained within the context of a branch-and-bound search. For a particular source/sink pair, the weakest (i.e., best slack) timing arcs are propagated through the timing graph, thus providing an optimistic upper bound on a worst-case negative slack value. If each gate (i.e., fixed or movable) of the net has been instantiated with legalized candidate locations, the actual timing arc between those specific legalized candidate locations is used. Backtracking along search tree 500 occurs whenever the upper bound on the worst-case negative slack value of all candidate nets 502 is no better than that of the previously best found solution of gate assignments. Any partial gate assignment using a legalized candidate location that cannot improve upon the worst-case negative slack value in the best known solution (i.e., a full gate solution) is pruned. The recursive branch-and-bound search discards one or more gate assignments when an upper bound on a worst-case negative slack value is not realizable from the partial gate assignment. Pruned branch-and-bound search space is identified in FIG. 5 by hatched regions 505, for which no further static timing analysis is performed for internal nodes associated with a pruned gate assignment. RSTA is performed for internal nodes associated with a non-pruned partial gate assignment to obtain the upper bound on the worst-case negative slack value. As a result, branch-and-bound search employing RSTA greatly improves the time, system, and cost resources that would be ordinarily be expended, particularly in large problem instances.

Continuing with the flowchart described in FIG. 2, once the brand-and-bound search has been performed and optimal locations for gate placement has been determined, method 200 continues to decision block 225. At decision block 225, a determination is made whether a suitable termination criterion has been met, allowing Path Smoothing utility 145 (FIG. 1) to perform additional iterations if necessary. In this regard, there are several termination criteria that can be used to determine whether additional passes of the method steps depicted in blocks 210-220 are performed. Such termination criteria include, but are not limited to whether, (i) a maximum number of iterations of blocks 210-220 has been reached, (ii) a predefined limit on runtime has been reached, or (iii) no improvement in timing (i.e., slack value) on movable gate(s) 302-306 (FIG. 3) is observed from the most recent placement of movable gate(s) 302-306. If one or more of the aforementioned termination criteria has been met, Path Smoothing utility 145 returns the best placement of movable gates 302-306 found across all iterations as the optimal solution for gate assignment (i.e., new or original gate assignment), as depicted in block 235. However, if none of the termination criteria has been met, Path Smoothing utility 145 returns to block 210, generating a new set of legalized candidate locations, and blocks 215, 220, and 225 are repeated. From block 235, the optimal solution solution for gate assignment is stored in DPS 100 (FIG. 1), as depicted in block 237. Method 200 terminates at end block 240.

In the flow chart above (FIG. 2), one or more of the methods are embodied as a computer program product in a computer readable medium or containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware, or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a computing device, a method for optimizing the timing-driven placement of one or more movable gates of a circuit in a physical synthesis flow, the computing device performs the method comprising:

identifying at least one movable gate based on at least one selection criteria;

generating a set of legalized candidate locations corresponding to at least one identified movable gate;

generating a disjunctive timing graph based on the generated set of legalized candidate locations;

determining an optimal location of at least one movable gate using a recursive branch-and-bound search of said disjunctive timing graph, wherein the recursive branch-and-bound search prunes at least one gate assignment when an upper bound on a worst-case negative slack value is not realizable from a partial gate assignment; and storing the optimal location of said at least one movable gate in the computing device, wherein a relaxed variation of static timing analysis (RSTA) is performed for internal nodes associated with a non-pruned partial gate assignment to obtain the upper bound on the worst-case negative slack value.

2. The method of claim 1, wherein the selection criteria comprises at least one of:

identifying one or more critical gates in the circuit;

identifying one or more critical paths of the circuit; and identifying one or more gates having the largest slack differential between an input timing point and an output timing point.

3. The method of claim 1, wherein the set of legalized candidate locations is determined by a candidate location strategy, including at least one of: a cardinal direction approach, a legalized cardinal direction approach, and a nearest neighbor approach.

4. The method of claim 1, wherein the disjunctive timing graph results from a combination of at least one optimization variable from among: gate placement, gate repowering, gate voltage threshold ($V_t$) assignment, and wire sizing.

5. The method of claim 1, wherein a static timing analysis is not performed for internal nodes associated with a pruned gate assignment.

6. A data processing system comprising:

a processor;

a system memory coupled to the processor; and a utility executing on the processor and having executable code for:

identifying at least one movable gate based on at least one selection criteria;

generating a set of legalized candidate locations corresponding to at least one identified movable gate;

generating a disjunctive timing graph based on the generated set of legalized candidate locations;

determining an optimal location of at least one movable gate using a recursive branch-and-bound search of said disjunctive timing graph, wherein the recursive branch-and-bound search prunes at least one gate assignment when an upper bound on a worst-case negative slack value is not realizable from a partial gate assignment; and storing the optimal location of said at least one movable gate in the system memory, wherein a relaxed variation of static timing analysis (RSTA) is performed for internal nodes associated with a non-pruned partial gate assignment to obtain the upper bound on the worst-case negative slack value.

7. The data processing system of claim 6, wherein the selection criteria comprises at least one of:

identifying one or more critical gates in the circuit;

identifying one or more critical paths of the circuit; and identifying one or more gates having the largest slack differential between an input timing point and an output timing point.

8. The data processing system of claim 6, wherein the set of legalized candidate locations is determined by a candidate location strategy, including at least one of: a cardinal direction approach, a legalized cardinal direction approach, and a nearest neighbor approach.

9. The data processing system of claim 6, wherein the disjunctive timing graph results from a combination of at least one optimization variable from among: gate placement, gate repowering, gate voltage threshold ($V_t$) assignment, and wire sizing.

10. The data processing system of claim 6, wherein a static timing analysis is not performed for internal nodes associated with a pruned gate assignment.

11. A computer program product comprising:
a computer storage device; and
program code on the computer storage device that when executed provides the functions of:
identifying at least one movable gate based on at least one selection criteria;
generating a set of legalized candidate locations corresponding to at least one identified movable gate;
generating a disjunctive timing graph based on the generated set of legalized candidate locations;
determining an optimal location of at least one movable gate using a recursive branch-and-bound search of said disjunctive timing graph, wherein the recursive branch-and-bound search prunes at least one gate assignment when an upper bound on a worst-case negative slack value is not realizable from a partial gate assignment; and
storing the optimal location of said at least one movable gate in the computer storage device, wherein a relaxed variation of static timing analysis (RSTA) is performed for internal nodes associated with a non-pruned partial gate assignment to obtain the upper bound on the worst-case negative slack value.

12. The computer program product of claim 11, wherein code for implementing the selection criteria comprises code for:
identifying one or more critical gates in the circuit;
identifying one or more critical paths of the circuit; and
identifying one or more gates having the largest slack differential between an input timing point and an output timing point.

13. The computer program product of claim 11, wherein the set of legalized candidate locations is determined by a candidate location strategy, including at least one of: a cardinal direction approach, a legalized cardinal direction approach, and a nearest neighbor approach.

14. The computer program product of claim 11, wherein the disjunctive timing graph results from a combination of at least one optimization variable from among: gate placement, gate repowering, gate voltage threshold ($V_t$) assignment, and wire sizing.

15. The computer program product of claim 11, wherein a static timing analysis is not performed for internal nodes associated with a pruned gate assignment.

* * * * *